(12) United States Patent
Long (10) Patent No.: US 10,348,678 B2
(45) Date of Patent: Jul. 9, 2019

(54) NETWORK DEVICE AND METHOD FOR ALLOCATING ACCESS POINT NAME (71) Applicant: Huawei Technologies Co., Ltd., Shenzhen, Guangdong (CN)

(72) Inventor: Sirui Long, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 62 days.

(21) Appl. No.: 15/391,015

(22) Filed: Dec. 27, 2016

(65) Prior Publication Data
US 2017/0111315 A1 Apr. 20, 2017

Related U.S. Application Data (63) Continuation of application No. PCT/CN2014/081273, filed on Jun. 30, 2014.

(51) Int. Cl.
H04L 29/12 (2006.01)
H04W 48/00 (2009.01)
(Continued)

(52) U.S. Cl.
CPC ...... *H04L 61/3015* (2013.01); *H04L 61/2061* (2013.01); *H04L 61/3075* (2013.01); *H04W 48/17* (2013.01); *H04L 61/605* (2013.01); *H04L 61/609* (2013.01); *H04L 61/6054* (2013.01); *H04W 76/10* (2018.02); *H04W 88/16* (2013.01)

(58) Field of Classification Search
CPC .......... H04L 61/3015; H04L 61/2061; H04L 61/3075; H04L 61/609; H04L 61/6054; H04L 61/605
See application file for complete search history.

(56) References Cited

U.S. PATENT DOCUMENTS

2005/0083899 A1 4/2005 Babbar et al.
2006/0221986 A1 10/2006 Berg
(Continued)

FOREIGN PATENT DOCUMENTS

CN 101453784 A 6/2009
CN 102057724 A 5/2011
(Continued)

OTHER PUBLICATIONS

Sun et al. Dec. 2008, CN102098760a, Method, system and device for accessing into core network nodes.*

*Primary Examiner* — Lakeram Jangbahadur (57) ABSTRACT

The present invention provides a network device and a method for allocating an access point name. The network device includes: a receiving module, configured to receive a user activation request sent by user equipment UE, where the user activation request includes user location information ULI; a parsing module, configured to parse the ULI received by the receiving module, to acquire an area code of a location of the UE; a determining module, configured to determine an area code set to which the area code acquired by the parsing module belongs; and an acquiring module, configured to acquire, according to a mapping relationship between the area code and an actual access point name APN, the actual APN for the UE. The embodiments of the present invention can implement centralized management on UE based on a geographical area range.

12 Claims, 4 Drawing Sheets (51) Int. Cl.
*H04W 76/10* (2018.01)
*H04W 88/16* (2009.01)

(56) References Cited

U.S. PATENT DOCUMENTS

| | | | |
|---|---|---|---|
| 2009/0116467 A1 | 5/2009 | Shi et al. | |
| 2011/0090852 A1 | 4/2011 | Ramle et al. | |
| 2011/0177826 A1* | 7/2011 | Huang | H04W 64/00 455/456.1 |
| 2012/0208515 A1* | 8/2012 | Alfano | H04W 48/04 455/418 |
| 2014/0024361 A1* | 1/2014 | Poon | H04W 12/06 455/419 |
| 2016/0269224 A1 | 9/2016 | Liu | |

FOREIGN PATENT DOCUMENTS

| | | |
|---|---|---|
| CN | 102098760 A | 6/2011 |
| CN | 102137487 A | 7/2011 |
| CN | 102348190 A | 2/2012 |
| CN | 102448038 A | 5/2012 |
| CN | 102547599 A | 7/2012 |
| EP | 2648466 A1 | 10/2013 |
| RU | 2325787 C2 | 5/2008 |
| RU | 2420036 C2 | 5/2011 |
| WO | 200915003 A1 | 12/2009 |
| WO | 2013053896 A1 | 4/2013 |

\* cited by examiner

NETWORK DEVICE AND METHOD FOR ALLOCATING ACCESS POINT NAME

CROSS-REFERENCE TO RELATED APPLICATIONS

This application is a continuation of International Application No. PCT/CN2014/081273, filed on Jun. 30, 2014, the disclosure of which is hereby incorporated by reference in its entirety.

TECHNICAL FIELD

Embodiments of the present invention relate to communications technologies, and in particular, to a network device and a method for allocating an access point name.

BACKGROUND

In the 3rd Generation Partnership Project (3GPP) and an Evolved Packet System (EPS) network that is defined by the 3GPP, an operator requires a gateway to perform network management and control on user equipment (UE) based on a location of the UE.

Currently, in 2nd generation (2G) and 3rd generation (3G) network architectures, an operator generally requires an Internet Protocol (IP) address to be assigned to a user based on a location area of UE, that is, requires an IP address of UE to correspond in real time to an area in which the UE is located, so that an International Mobile Subscriber Identity (IMSI) and a Mobile Station International ISDN Number (MSISDN) of the user can be found according to the IP address of the user; further, a network device can perform network management according to the IP address of the UE. During live network operation, a Serving GPRS Support Node (SGSN), serving as a core network element, not only can carry signaling but also can carry data, and can manage location information of the UE, that is, in the 2G/3G network architecture, the SGSN may collect performance statistics on data traffic according to the location information of the UE.

However, in a current EPS network, a core network lacks a network element that performs centralized management on UE based on a geographical area range.

SUMMARY

Embodiments of the present invention provide a network device and a method for allocating an access point name, which can implement centralized management on UE based on a geographical area range.

According to a first aspect, an embodiment of the present invention provides a network device, including:

a receiving module, configured to receive a user activation request sent by user equipment UE, where the user activation request includes user location information ULI;

a parsing module, configured to parse the ULI received by the receiving module, to acquire an area code of a location of the UE;

a determining module, configured to determine an area code set to which the area code acquired by the parsing module belongs, where user locations indicated by area codes in the area code set are within a same geographical area range; and an acquiring module, configured to acquire, according to a mapping relationship between the area code set determined by the determining module and an actual access point name APN, the actual APN for the UE.

In a first possible implementation manner of the first aspect, the area code set and the mapping relationship between the area code set and the actual APN are configured in the network device.

According to the first aspect or the first possible implementation manner of the first aspect, in a second possible implementation manner, the area code includes a location area code LAC, a routing area code RAC, or a tracking area code TAC.

According to the first aspect or either one of the first and second possible implementation manners of the first aspect, in a third possible implementation manner, the user activation request further includes an APN requested by the UE; and the determining module is further configured to: before the parsing module parses the ULI, determine that the APN requested by the UE has subscription information in the actual APN.

According to the first aspect or any one of the first to third possible implementation manners of the first aspect, in a fourth possible implementation manner, the network device includes a serving general packet radio service GPRS support node SGSN, a gateway GPRS support node GGSN, a mobility management entity MME, or a packet data gateway P-GW.

According to the first aspect or any one of the first to third possible implementation manners of the first aspect, in a fifth possible implementation manner, the network device is a GGSN or a P-GW, and there is a correspondence between the actual APN and an Internet Protocol IP address pool; and the network device further includes an address assignment module, configured to assign an IP address to the UE from the IP address pool.

According to the first aspect or any one of the first to third possible implementation manners of the first aspect, in a sixth possible implementation manner, the network device is a GGSN or a P-GW; and the network device further includes a statistics collecting module, configured to collect statistics on data traffic or signaling in a case of the actual APN, to acquire a data traffic statistical result or a signaling statistical result for access UE within the geographical area range.

According to the first aspect or any one of the first to third possible implementation manners of the first aspect, in a seventh possible implementation manner, the network device is a GGSN or a P-GW, the actual APN is corresponding to configuration information, and the configuration information includes: a quantity of access UE, used bandwidth, a charging policy, an authentication policy, or a service control policy; and the network device further includes a control module, configured to control, according to the configuration information, UE that accesses the actual APN.

According to a second aspect, an embodiment of the present invention provides a network device, including:

a receiver, configured to receive a user activation request sent by user equipment UE, where the user activation request includes user location information ULI; and a processor, configured to parse the ULI received by the receiver, to acquire an area code of a location of the UE, where the processor is further configured to determine an area code set to which the acquired area code belongs, where user locations indicated by area codes in the area code set are within a same geographical area range; and the processor is further configured to acquire, according to a mapping relationship between the determined area code set and an actual access point name APN, the actual APN for the UE.

In a first possible implementation manner of the second aspect, the area code set and the mapping relationship between the area code set and the actual APN are configured in the network device.

According to the second aspect or the first possible implementation manner of the second aspect, in a second possible implementation manner, the area code includes a location area code LAC, a routing area code RAC, or a tracking area code TAC.

According to the second aspect or either one of the first and second possible implementation manners of the second aspect, in a third possible implementation manner, the user activation request further includes an APN requested by the UE; and the processor is further configured to: before parsing the ULI, determine that the APN requested by the UE has subscription information in the actual APN.

According to the second aspect or anyone of the first to third possible implementation manners of the second aspect, in a fourth possible implementation manner, the network device includes a serving general packet radio service GPRS support node SGSN, a gateway GPRS support node GGSN, a mobility management entity MME, or a packet data gateway P-GW.

According to the second aspect or anyone of the first to third possible implementation manners of the second aspect, in a fifth possible implementation manner, the network device is a GGSN or a P-GW, and there is a correspondence between the actual APN and an Internet Protocol IP address pool; and the processor is further configured to assign an IP address to the UE from the IP address pool.

According to the second aspect or anyone of the first to third possible implementation manners of the second aspect, in a sixth possible implementation manner, the network device is a GGSN or a P-GW; and the processor is further configured to collect statistics on data traffic or signaling in a case of the actual APN, to acquire a data traffic statistical result or a signaling statistical result for access UE within the geographical area range.

According to the second aspect or anyone of the first to third possible implementation manners of the second aspect, in a seventh possible implementation manner, the network device is a GGSN or a P-GW, the actual APN is corresponding to configuration information, and the configuration information includes: a quantity of access UE, used bandwidth, a charging policy, an authentication policy, or a service control policy; and the processor is further configured to control, according to the configuration information, UE that accesses the actual APN.

According to a third aspect, an embodiment of the present invention provides a method for allocating an access point name, including:

receiving, by a network device, a user activation request sent by user equipment UE, where the user activation request includes user location information ULI;

parsing, by the network device, the ULI, to acquire an area code of a location of the UE;

determining, by the network device, an area code set to which the area code belongs, where user locations indicated by area codes in the area code set are within a same geographical area range; and acquiring, by the network device according to a mapping relationship between the area code set and an actual APN, the actual APN for the UE.

In a first possible implementation manner of the third aspect, the area code set and the mapping relationship between the area code set and the actual APN are configured in the network device.

According to the third aspect or the first possible implementation manner of the third aspect, in a second possible implementation manner, the area code includes a location area code LAC, a routing area code RAC, or a tracking area code TAC.

According to the third aspect or either one of the first and second possible implementation manners of the third aspect, in a third possible implementation manner, the user activation request further includes an APN requested by the UE; and before the network device parses the ULI, the method further includes: determining that the APN requested by the UE has subscription information in the actual APN.

According to the third aspect or any one of the first to third possible implementation manners of the third aspect, in a fourth possible implementation manner, the network device includes a serving general packet radio service GPRS support node SGSN, a gateway GPRS support node GGSN, a mobility management entity MME, or a packet data gateway P-GW.

According to the third aspect or any one of the first to third possible implementation manners of the third aspect, in a fifth possible implementation manner, the network device is a GGSN or a P-GW, and there is a correspondence between the actual APN and an Internet Protocol IP address pool; and the method further includes:

assigning, by the network device, an IP address to the UE from the IP address pool.

According to the third aspect or any one of the first to third possible implementation manners of the third aspect, in a sixth possible implementation manner, the network device is a GGSN or a P-GW; and the method further includes:

collecting, by the network device, statistics on data traffic or signaling in a case of the actual APN, to acquire a data traffic statistical result or a signaling statistical result for access UE within the geographical area range.

According to the third aspect or any one of the first to third possible implementation manners of the third aspect, in a seventh possible implementation manner, the network device is a GGSN or a P-GW, the actual APN is corresponding to configuration information, and the configuration information includes: a quantity of access UE, used bandwidth, a charging policy, an authentication policy, or a service control policy; and the method further includes:

controlling, by the network device according to the configuration information, UE that accesses the actual APN.

According to the network device and the method for allocating an access point name provided by the embodiments of the present invention, UE within a same geographical area range accesses a same actual APN; and management on UE in a case of the actual APN is management on the UE located within the same geographical area range; therefore, centralized management on UE based on a geographical area range can be implemented.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

A technology described in this specification is applicable to various network systems, for example, a current 2G/3G system and a next generation network system such as a Code Division Multiple Access (CDMA) system, a Time Division Multiple Access (TDMA) system, a Wideband Code Division Multiple Access (WCDMA) network, a Frequency Division Multiple Access (FDMA) system, an Orthogonal Frequency-Division Multiple Access (OFDMA) system, a single carrier FDMA (SC-FDMA) system, a General Packet Radio Service (GPRS) system, an Evolved Packet System (EPS) network, and another network system of this type.

UE may be a wireless terminal or a wired terminal. The wireless terminal may refer to a device that provides voice and/or data connectivity for a user, a handheld device with a wireless connection function, or another processing device connected to a wireless modem. The wireless terminal may communicate with one or more core networks through a Radio Access Network (RAN). The wireless terminal may be a mobile terminal, such as a mobile phone (or referred to as a "cellular" phone) or a computer equipped with a mobile terminal, for example, may be a portable, pocket-sized, handheld, computer built-in, or in-vehicle mobile apparatus, which exchanges voice and/or data with the radio access network. For example, it may be a device such as a Personal Communication Service (PCS) phone, a cordless telephone set, a Session Initiation Protocol (SIP) phone, a Wireless Local Loop (WLL) station, or a Personal Digital Assistant (PDA). The wireless terminal may also be referred to as a system, a subscriber unit, a subscriber station, a mobile station, a mobile terminal, a remote station, an access point, a remote terminal, an access terminal, a user terminal, a user agent, a user device, or user equipment.

A network device described in this application, that is, a network element in a core network, for example, may include an SGSN or a Gateway GPRS Support Node (GGSN) in a 2G/3G network, a Mobility Management Entity (MME) or a Packet Data Network (PND) gateway (P-GW) in an EPS network, and a Packet Data Serving Node (PDSN) or a High Rate Packet Data (HRPD) Serving GateWay (HSGW) in a CDMA network.

Embodiment 1

Figure 1:
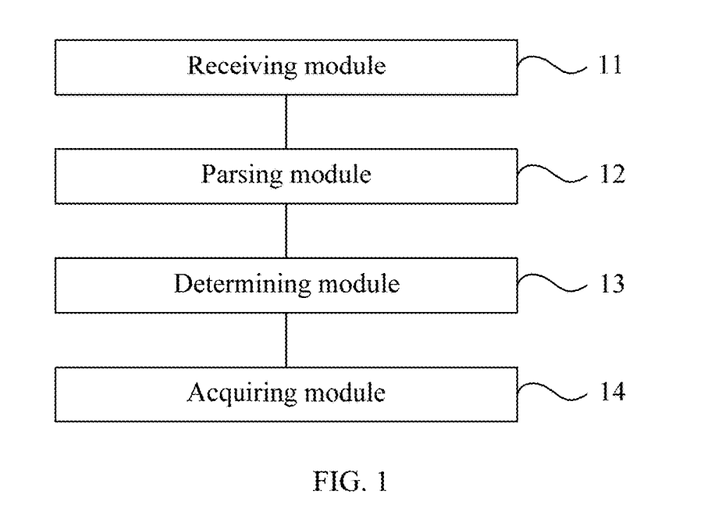
FIG. 1 is a schematic structural diagram of a network device according to Embodiment 1 of the present invention.

FIG. 1 is a schematic structural diagram of a network device according to Embodiment 1 of the present invention. The network device in this embodiment is applicable to a case in which network management is implemented according to a geographical area of UE. The network device may be implemented by means of hardware or software, which may be integrated in a memory of the network device, for example, integrated in a chip of a processor, so as to be invoked and executed by the processor. The network device in this embodiment specifically includes: a receiving module 11, a parsing module 12, a determining module 13, and an acquiring module 14.

The receiving module 11 is configured to receive a user activation request sent by UE, where the user activation request includes User Location Information (ULI).

A current network operator, such as China Mobile, China Unicom, or China Telecom, generally requires that a gateway be capable of performing management and control on UE based on location information of the UE, and therefore requires that an IP address of the UE be corresponding in real time to an area in which the UE is located, so that the network device may execute a corresponding management policy according to the IP address of the UE. In an EPS network, an MME is only responsible for functions such as mobility management and signaling processing, an S-GW is connected to an evolved Node Base, (eNB), and is mainly responsible for functions such as data transmission, forwarding, and routing and switching of user equipment, and a P-GW is responsible for functions such as IP address assignment of UE, Quality of Service (QoS) guarantee, and charging. Data traffic in the EPS network may directly flow from the eNB to the S-GW or the P-GW without passing through the MME. However, the eNB is a network element of an EPS, and is not a network element of an Evolved Packet Core (EPC). Therefore, although the eNB can collect statistics on data traffic of the eNB itself, on one hand, because the eNB is not a network element of the EPC, the eNB cannot collect statistics on and manage data traffic of network elements in the EPC, and on the other hand, when there are a large quantity of eNBs in the EPS network, it is adverse to summarize statistical data. Therefore, in the current EPS network, the EPC lacks a network element that can perform centralized management on UE based on a geographical area range.

The network device provided by this embodiment of the present invention can execute, based on the location information of the UE, an APN allocation task and perform a network management function based on an allocated APN, has comprehensive use performance, and is widely applicable to a 2G/3G network, an EPS network, a CDMA network, and the like. In this embodiment, the EPS network is used as an example for description, and the network device may be an MME or a P-GW. Specifically, an Evolved Universal Terrestrial Radio Access Network (E-UTRAN) is generally a network consisting of multiple eNBs, where the eNB is connected to an S-GW by using a GPRS Tunnel Protocol (GTP) User Plane (GTP-U) interface to transmit user data, is connected to the MME by using a control plane interface, and when the UE requests to access the EPS network, initiates an attachment procedure and carries the user activation request. For the network device, the MME may perform APN allocation when the MME receives the user activation request forwarded by the eNB. In addition, the P-GW may also perform APN allocation after the MME forwards the user activation request to the P-GW through the S-GW. It should be noted that, a manner in which the MME performs APN allocation is the same as a manner in which the P-GW performs APN allocation, and in the 2G/3G network, APN allocation may be performed by using an SGSN or a GGSN. In this embodiment, an example in which the P-GW performs APN allocation is specifically used for description. The user activation request received by the P-GW includes the ULI, where the ULI is used to indicate a current geographical area of the UE.

It should be noted that, a process in which the UE accesses the EPS network through the attachment procedure and establishes a PDN connection is a method in the prior art, and is not described in detail herein. When the UE accesses the network, the MME may select, according to a location area of the UE, a P-GW that suits the UE. All network devices provided by this embodiment are network elements in the EPC. In the EPS network, management on the UE based on the geographical area range can be implemented by using the network device, and network management can be performed on an implementable function in the EPS according to a geographical area of the UE.

The parsing module 12 is configured to parse the ULI received by the receiving module 11, to acquire an area code of a location of the UE.

In this embodiment, the P-GW parses the ULI in the user activation request, where the ULI indicates the geographical area in which the UE is located. Similarly, multiple P-GWs are disposed in the E-UTRAN, UE within coverage of a same eNB generally performs data transmission with an external network by using a same P-GW, that is, the P-GW learns, according to a parsing result of the received ULI, the area code indicating the location of the UE. Specifically, the area code indicating the location of the UE may include a Location Area Code (LAC), a Routing Area Code (RAC), or a Tracking Area Code (TAC) of the UE.

It should be noted that, when data routing occurs due to a change of the geographical area of the UE, a PDN connection needs to be reestablished; a re-sent user activation request includes ULI obtained after a location of the UE changes, and a parsing result of the ULI and a re-acquired area code also change.

The determining module 13 is configured to determine an area code set to which the area code acquired by the parsing module 12 belongs, where user locations indicated by area codes in the area code set are within a same geographical area range.

In this embodiment, the P-GW interacts with the UE by using the eNB. Generally, network management may be performed on multiple pieces of UE in a coverage area of the eNB by using geographical area information of the UE as basic information of network management, that is, UE in the coverage area of the eNB may be managed according to an area code of the UE. Therefore, an area code set and a mapping relationship between the area code set and an actual APN are configured in the P-GW, where the set includes area codes of all pieces of UE that can perform data transmission with an external network by using the P-GW. The P-GW provides guidance for network management by managing the area codes in the set. Generally, the P-GW searches the set for a known area code of UE, to determine an area code set to which the area code of the UE belongs. It should be noted that, user locations indicated by area codes in a same area code set are within a same geographical area range, that is, area codes of UE within a same geographical area range are mapped to a same area code set.

It should be noted that, when the UE re-sends the user activation request due to the change of the geographical area, because the request includes the ULI obtained after the location of the UE changes, that is, the area code of the UE changes, the P-GW needs to re-determine an area code set to which the area code of the UE belongs.

The acquiring module 14 is configured to acquire, according to a mapping relationship between the area code set determined by the determining module 13 and an actual APN, the actual APN for the UE.

In this embodiment, in the P-GW, not only the area code set is configured, but also the mapping relationship between the area code set and the actual APN is configured. When UE that requests access selects an actually accessed APN, the P-GW may perform management and planning according to the mapping relationship, for example, may provide a planned access rule in advance, and may map the UE to the actually accessed APN with reference to an area code of the UE and an area code set to which the area code belongs in the P-GW, where the mapping relationship is specifically a mapping rule preset by a design personnel. The mapping between the UE and the actually accessed APN is actually mapping between a geographical area in which the UE is located and the APN actually accessed by the UE, that is, mapping between the area code set to which the area code of the UE belongs in the P-GW and the actually accessed APN. Therefore, network management performed by the P-GW provided by this embodiment according to the APN actually accessed by the UE is actually network management performed on the UE based on the geographical area range.

It should be noted that, on one hand, in the 3GPP protocol, policy control may be performed by using a Policy and Charging Rules Function (PCRF) network element; however, to deploy the PCRF network, a hardware facility needs to be added, which increases costs of a network system, but the network element is not deployed on all live networks. On the other hand, during live network operation, an operator puts forward a demand for executing, based on a user location area, various network management policies, for example, bandwidth management, control on a quantity of access UE, charging management, and data traffic statistics; however, in the EPS network, the S-GW and the P-GW are not responsible for managing a location area. If a management mechanism based on a location area is established in the SGW/PGW to meet the demand, massive workloads and hardware costs are needed. For example, for IP address assignment based on a user location area, a binding management mechanism for the location area and an address pool needs to be established; for performance statistics based on the user location area, a set of measurement objects based on the location area need to be created, hundreds or even thousands of performance statistical items of the measurement objects based on the location area need to be added; and for control, based on the location area, on bandwidth or a quantity of users that perform access, statistics, collected in each location area, on a quantity of users or used bandwidth need to be maintained.

For the network device provided by this embodiment, the APN actually accessed by the UE identifies an external network connected by using the P-GW, for example, an Internet Service Provider (ISP) network or an enterprise network; or identifies a service of type associated with the APN, for example, an Internet access service or a Wireless Application Protocol (WAP) service. In addition, the actual APN is also a unit for user partitioning in the P-GW, that is, in the P-GW, a user performance policy such as charging measurement, QoS guarantee, and security and service control may be configured based on the APN actually accessed by the UE, and different APNs may have different policies, thereby implementing flexible charging and service control.

According to the network device provided by this embodiment, a receiving module receives a user activation request sent by UE that requests to access a network, where the user activation request includes ULI of the UE; a parsing module parses the ULI to acquire an area code of a location of the UE; a determining module determines an area code set to which the area code belongs; and further, an acquiring module acquires, according to a mapping relationship between the area code set to which the area code of the UE belongs and an actual APN, the actual APN for the UE. In this embodiment, UE within a same geographical area range accesses a same actual APN; and management on UE of the actual APN is management on the UE located within the same geographical area range; therefore, centralized management on UE based on a geographical area range can be implemented.

Embodiment 2

Figure 2:
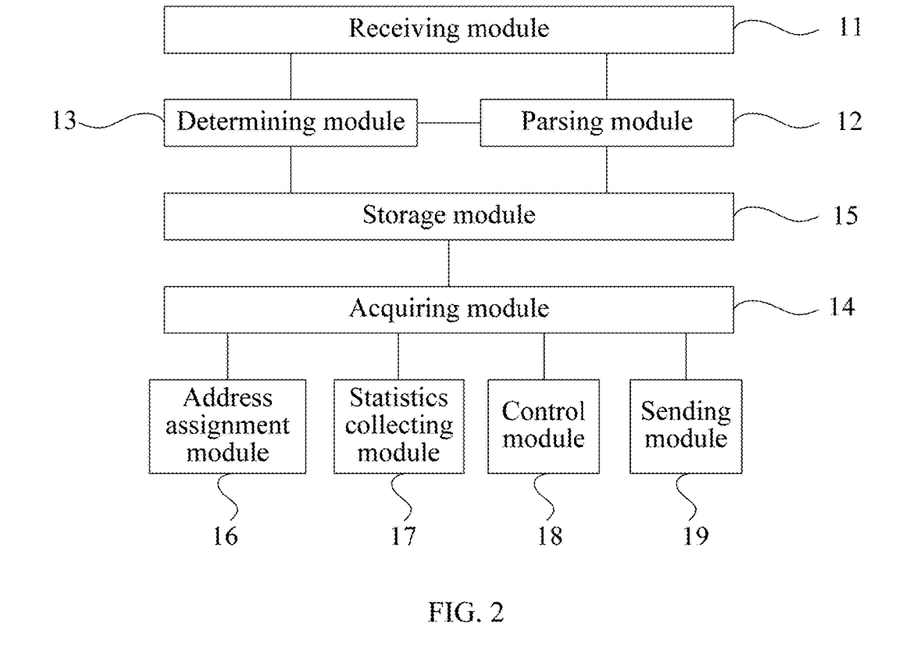
FIG. 2 is a schematic structural diagram of a network device according to Embodiment 2 of the present invention.

FIG. 2 is a schematic structural diagram of a network device according to Embodiment 2 of the present invention. Based on the network device provided by FIG. 1, in this embodiment, the area code set and the mapping relationship between the area code set and the actual APN, configured in the network device, may be specifically configured in a storage module 15. Optionally, the user activation request received by the receiving module 11 further includes an APN requested by the UE; correspondingly, the determining module 13 is further configured to: before the parsing module 12 parses the ULI, determine that the APN requested by the UE has subscription information in the actual APN.

In this embodiment, the example in which network management is performed in the EPS network by using the P-GW is still used for description. When receiving the activation request sent by the UE, the P-GW queries, according to the APN requested by the UE, whether the UE has the subscription information in the actual APN of the UE. The APN requested by the UE is a network to which the UE has subscribed in a plan of an operator, which, for example, may include China Mobile, China Unicom, China Telecom, or the like. A subscribed geographical area of the UE that requests to access the P-GW and the P-GW may be in different geographical area ranges. Therefore, when receiving the user activation request, the P-GW may query, according to the APN requested by the UE, whether the actual APN included in the mapping relationship configured by the P-GW and the APN requested by the UE have the subscription information, so as to determine whether to allocate the actual APN to the UE.

The area code in this embodiment also includes a LAC, a RAC, or a TAC. An example in which the area code is the LAC is used for description. The area code set is a LAC GROUP. Generally, one LAC identity segment includes multiple LAC IDs (Identity number), and one LAC GROUP consists of multiple LAC identity segments, that is, the area code set and an area code identity segment are configured in the storage module 15. Correspondingly, after the parsing module 12 parses the ULI received by the receiving module 11, to acquire the area code of the location of the UE, specifically, the determining module 13 searches the area code identity segment and the area code set that are configured in the storage module 15 for the acquired area code of the UE, to acquire the area code set to which the area code of the UE belongs.

During specific implementation, when receiving the user activation request, the P-GW may obtain, through parsing, a value of the LAC, the RAC, or the TAC from the ULI in the request. It should be noted that, the P-GW may also obtain, through parsing, a Routing Area Identity (RAI) in the user activation request. Specifically, a user activation request sent by using the gtpv0/gtpv1 protocol is a create Packet Data Protocol (PDP) context request, where the request for the gtpv0 protocol includes an RAI cell, and the request for the gtpv1 protocol includes a ULI and/or RAI cell; a user activation request sent by using the gtpv2 protocol is a create session request, where the request for the gtpv2 protocol includes a ULI cell. After the value of the LAC, the RAC, or the TAC is acquired, the area code identity segment and the area code set that are configured in the P-GW may be searched. For example, by using an acquired LAC ID, a LAC identity segment to which the LAC ID belongs is found, and further, a LAC GROUP corresponding to the LAC identity segment is found.

Figure 3:
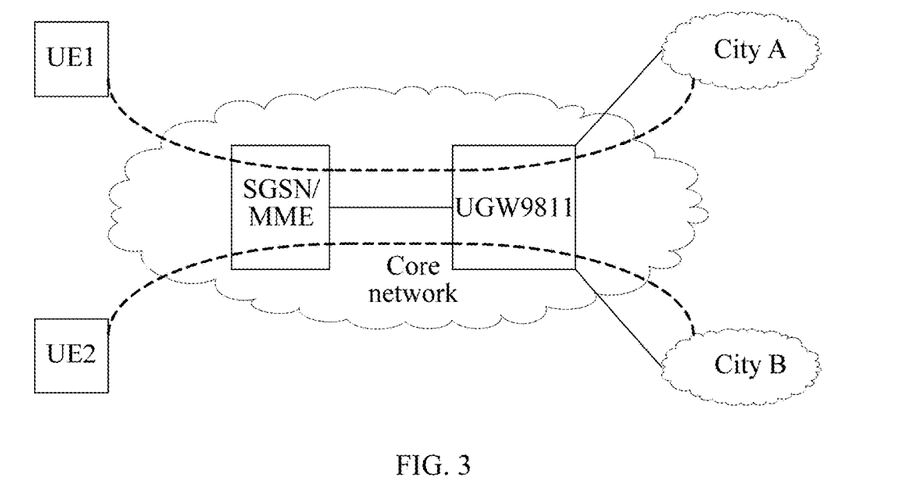
FIG. 3 is a schematic diagram of a manner of mapping between UE and an actual APN in the network device according to the embodiment shown in FIG. 2.

During specific implementation, the mapping relationship between the area code set to which the area code of the UE belongs and the actual APN is preset by a design personnel. FIG. 3 is a schematic diagram of a manner of mapping between UE and an actual APN in the network device provided by the embodiment shown in FIG. 2. As shown in the figure, a core network may be a 2G/3G network or an EPS network; an SGSN/MME is responsible for mobility management and signaling processing; UGW9811 is a uniform packet data gateway device produced by HUAWEI, and integrates functions of network elements of a GGSN, an S-GW, and a P-GW, reducing operation costs of an operator and improving a network deployment capability; UE1 and UE2 access the core network and are mapped to corresponding actual APNs. For example, an APN mapping rule may be as follows: for UE that is activated by using a China Mobile Internet (CMNET) APN, if a location area in which the UE is located belongs to a LAC GROUP A, the UE is mapped to an APN City A; or if a location area in which a user is located belongs to a LAC GROUP B, the user is mapped to an APN City B. Generally, one or more LAC GROUPs are corresponding to one APN. For example, a LAC value of the UE1 is 0*1111, a LAC value of the UE2 is 0*2111, the LAC values of both the UE1 and the UE2 are in a LAC identity segment of the LAC GROUP, identity segment A includes 0*1111 and 0*1112, identity segment B includes 0*2111 and 0*2112, and APNs that can be actually accessed includes the City A and the City B; therefore, according to the foregoing APN mapping rule, the APN actually accessed by the UE1 is the City A, the APN actually accessed by the UE2 is the City B, and there is a preset address pool in both the City A and the City B, which, for example, may be a City A (10.0.0.0/16) and a City B (10.1.0.0/16) respectively.

It should be noted that, the network device provided by this embodiment may also be an SGSN or a GGSN in a 2G/3G network, or a PDSN/HSGW in a CDMA network.

According to the network device provided by this embodiment, a receiving module receives a user activation request sent by UE that requests to access a network, where the user activation request includes ULI of the UE; a parsing module parses the ULI to acquire an area code of a location of the UE; a determining module determines an area code set to which the area code belongs; and further, an acquiring module acquires, according to a mapping relationship between the area code set to which the area code of the UE belongs and an actual APN, the actual APN for the UE. In this embodiment, UE within a same geographical area range accesses a same actual APN; and management on UE of the actual APN is management on the UE located within the same geographical area range; therefore, centralized management on UE based on a geographical area range can be implemented, thereby improving practicability and flexibility of network management, and correspondingly controlling costs required for performing network management.

Further, on the basis of acquiring the actually accessed APN according to the geographical area of the UE in the foregoing embodiment, the network device may perform network management and control on the UE according to the APN actually accessed by the UE, that is, network management and control performed based on the user geographical area. It should be noted that, in the following embodiments, the network device that performs management and control is specifically a GGSN in a 2G/3G network or a P-GW in an EPS network. There is a correspondence between the actual APN accessed by the UE and an IP address pool. The network device provided by this embodiment may further include an address assignment module 16, configured to assign an IP address to the UE from the IP address pool. The network device may further include a statistics collecting module 17, configured to collect statistics on data traffic or signaling in a case of the actual APN, to acquire a data traffic statistical result or signaling statistics for access UE within the geographical area range.

Further, the actual APN accessed by the UE is corresponding to configuration information, where the configuration information may include: a quantity of access UE, used bandwidth, a charging policy, an authentication policy, or a service control policy. Correspondingly, the network device further includes a control module 18, configured to control, according to the configuration information, the UE that accesses the actual APN. During specific implementation, the network device may further include a sending module 19, configured to send user information of the UE to an external server, where the user information may include a correspondence between the UE and the accessed actual APN, and the external server, for example, is a Remote Authentication Dial In User Service (RADIUS) server, a service report server, a call history server, or the like, so that the external server analyzes, based on the actual APN, user data reported by using the network device, and then analysis data based on the user geographical area can be obtained.

Embodiment 3

Figure 4:
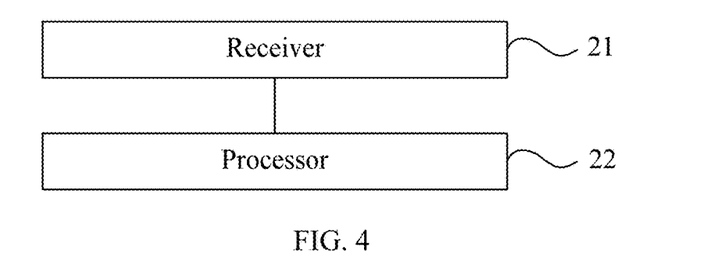
FIG. 4 is a schematic structural diagram of a network device according to Embodiment 3 of the present invention.

FIG. 4 is a schematic structural diagram of a network device according to Embodiment 3 of the present invention. The network device in this embodiment is applicable to a case in which network management is implemented according to a geographical area of UE. The network device may be implemented by means of hardware or software, which may be integrated in a memory of the network device, for example, integrated in a chip of a processor, so as to be invoked and executed by the processor. The network device in this embodiment specifically includes: a receiver 21 and a processor 22.

The receiver 21 is configured to receive a user activation request sent by UE, where the user activation request includes ULI.

The network device provided by this embodiment of the present invention can execute, based on the location information of the UE, an APN allocation task, and perform a network management function based on an allocated APN, has comprehensive use performance, and is widely applicable to a 2G/3G network, an EPS network, a CDMA network, and the like. In this embodiment, the EPS network is used as an example for description, and the network device may be an MME or a P-GW. A specific manner in which the MME or the P-GW performs APN allocation for the UE that requests access has been described in the foregoing embodiment, and details are not provided herein again. Similarly, in the 2G/3G network, APN allocation may be performed by using an SGSN or a GGSN. In this embodiment, an example in which the P-GW performs APN allocation is specifically used for description. The user activation request received by the P-GW includes the ULI, where the ULI is used to indicate a current geographical area of the UE.

It should be noted that, a process in which the UE accesses the EPS network through an attachment procedure and establishes a PDN connection is a method in the prior art, and is not described in detail herein. When the UE accesses the network, the MME may select, according to a location area of the UE, a P-GW that suits the UE. All network devices provided by this embodiment are network elements in an EPC. In the EPS network, management on the UE based on a geographical area range can be implemented by using the network device, and network management can be performed on an implementable function in the EPS according to the geographical area of the UE.

The processor 22 is configured to parse the ULI received by the receiver 21, to acquire an area code of a location of the UE.

Generally, the area code of the location of the UE may include a LAC, a RAC, or a TAC of the UE. When data routing occurs due to a change of the geographical area of the UE, a PDN connection needs to be reestablished; a re-sent user activation request includes ULI obtained after a location of the UE changes, and a parsing result of the ULI and a re-acquired area code also change.

The processor 22 is further configured to determine an area code set to which the acquired area code belongs, where user locations indicated by area codes in the area code set are within a same geographical area range.

In this embodiment, when the UE re-sends the user activation request due to the change of the geographical area, because the request includes the ULI obtained after the location of the UE changes, that is, the area code of the UE changes, the P-GW needs to re-determine an area code set to which the area code of the UE belongs.

The processor 22 is further configured to acquire, according to a mapping relationship between the determined area code set and an actual APN, the actual APN for the UE.

In this embodiment, the area code set and the mapping relationship between the area code set and the actual APN are configured in the P-GW. When selecting the actually accessed APN, the P-GW may manage and plan, according to the mapping relationship, the UE that requests access, for example, may provide a planned access rule in advance.

The network device provided by this embodiment of the present invention is a physical apparatus corresponding to the network device provided by the embodiment shown in FIG. 1 in the present invention. Functions of physical devices of the physical apparatus are corresponding to functions of the modules of the network device provided by this embodiment of the present invention; implementation principles and technical effects thereof are similar, and details are not provided herein again.

Figure 5:
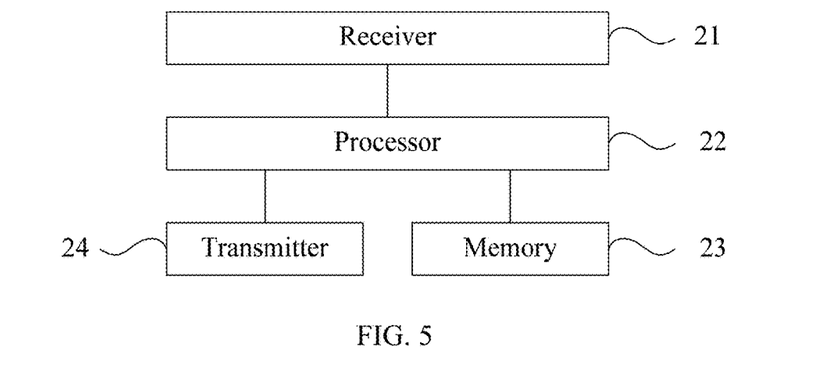
FIG. 5 is a schematic structural diagram of another network device according to an embodiment of the present invention.

FIG. 5 is a schematic structural diagram of another network device according to this embodiment of the present invention. The network device in this embodiment bases on the foregoing device shown in FIG. 4, and the area code set and the mapping relationship between the area code set and the actual APN, configured in the network device, may be specifically configured in a memory 23. Optionally, the user activation request received by the receiver 21 further includes an APN requested by the UE; correspondingly, the processor 22 is further configured to: before parsing the ULI, determine that the APN requested by the UE has subscription information in the actual APN.

It should be noted that, in this embodiment, the mapping relationship between the area code set to which the area code of the UE belongs and the actual APN is preset by a design personnel. Reference may still be made to FIG. 3, which is also a schematic diagram of a manner of mapping between UE and an APN in the network device according to the embodiment shown in the figure. A mapping rule thereof is the same as that in the foregoing embodiment, and therefore, details are not provided herein again.

Further, on the basis of acquiring the actually accessed APN according to the geographical area of the UE in the foregoing embodiment, the network device may perform network management and control on the UE according to the APN actually accessed by the UE, that is, network management and control performed based on the user geographical area. It should be noted that, in the following embodiments, the network device that performs management and control is specifically a GGSN in a 2G/3G network or a P-GW in an EPS network. There is a correspondence between the actual APN accessed by the UE and an IP address pool. Correspondingly, in the network device provided by this embodiment, the processor 22 is further configured to assign an IP address to the UE from the IP address pool. In addition, on this basis, the processor 22 may be further configured to collect statistics on data traffic or signaling in a case of the actual APN, to acquire a data traffic statistical result or signaling statistics for access UE within the geographical area range.

Further, the actual APN accessed by the UE is corresponding to configuration information, where the configuration information may include: a quantity of access UE, used bandwidth, a charging policy, an authentication policy, or a service control policy. Correspondingly, the processor 22 of the network device is further configured to control, according to the configuration information, the UE that accesses the actual APN. During specific implementation, the network device may further include a transmitter 24, configured to send user information of the UE to an external server, where the user information may include a correspondence between the UE and the accessed actual APN, and the external server, for example, is a RADIUS server, a service report server, a call history server, or the like, so that the external server analyzes, based on the actual APN, user data reported by using the network device, and then analysis data based on the user geographical area can be obtained.

The network device provided by this embodiment of the present invention is a physical apparatus corresponding to the network device provided by the embodiment shown in FIG. 2 in the present invention. Functions of physical devices of the physical apparatus are corresponding to functions of the modules of the network device provided by this embodiment of the present invention; implementation principles and technical effects thereof are similar, and details are not provided herein again.

Embodiment 4

Figure 6:
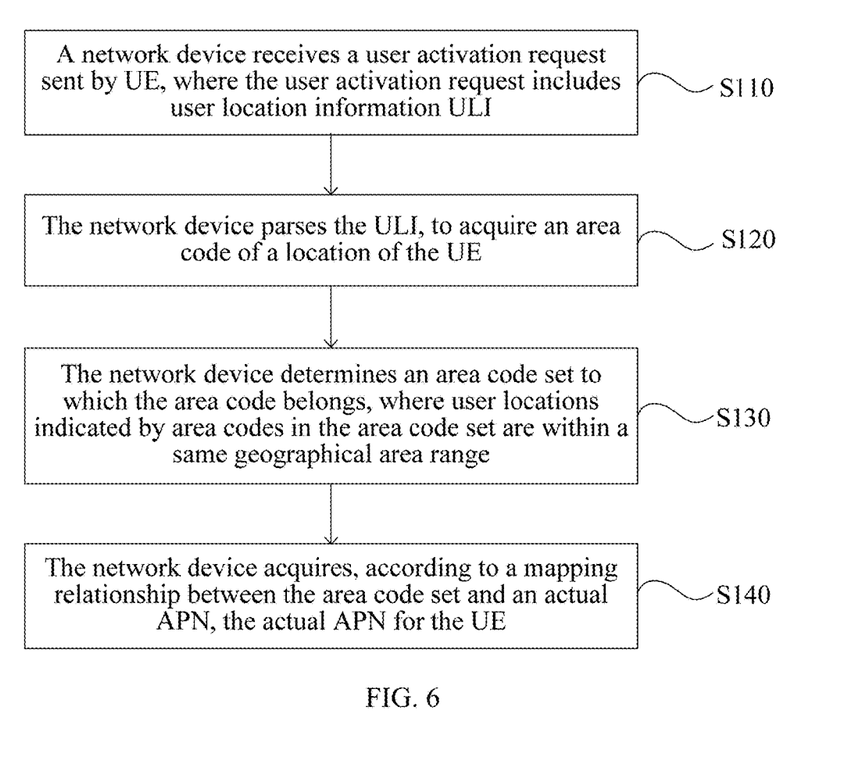
FIG. 6 is a flowchart of a method for allocating an APN according to Embodiment 4 of the present invention.

FIG. 6 is a flowchart of a method for allocating an APN according to Embodiment 4 of the present invention. A network device in this embodiment is applicable to a case in which network management is implemented according to a geographical area of UE. The network device may be implemented by means of hardware or software, which may be integrated in a memory of the network device, for example, integrated in a chip of a processor, so as to be invoked and executed by the processor. The method for allocating an APN provided by this embodiment includes the following steps:

S110: A network device receives a user activation request sent by UE, where the user activation request includes user location information ULI.

The method for allocating an APN provided by this embodiment of the present invention can execute an APN allocation task based on location information of UE, and perform a network management function based on an allocated APN, has comprehensive use performance, and is widely applicable to a 2G/3G network, an EPS network, a CDMA network, and the like. In this embodiment, the EPS network is used as an example for description. The network device may be an MME or a P-GW. A specific manner in which the MME or the P-GW performs APN allocation for the UE that requests access has been described in the foregoing embodiment, and details are not provided herein again. Similarly, in the 2G/3G network, APN allocation may be performed by using an SGSN or a GGSN. In this embodiment, an example in which the P-GW performs APN allocation is specifically used for description. The user activation request received by the P-GW includes the ULI, where the ULI is used to indicate a current geographical area of the UE.

It should be noted that, a process in which the UE accesses the EPS network through an attachment procedure and establishes a PDN connection is a method in the prior art, and is not described in detail herein. When the UE accesses the network, the MME may select, according to a location area of the UE, a P-GW that suits the UE. All network devices for executing the allocation method provided by this embodiment are network elements in an EPC. In the EPS network, management on the UE based on a geographical area range can be implemented by using the network device, and network management can be performed on an implementable function in the EPS according to the geographical area of the UE.

S120: The network device parses the ULI, to acquire an area code of a location of the UE.

Generally, the area code of the location of the UE may include a LAC, a RAC, or a TAC of the UE. When data routing occurs due to a change of the geographical area of the UE, a PDN connection needs to be reestablished; a re-sent user activation request includes ULI obtained after a location of the UE changes, and a parsing result of the ULI and a re-acquired area code also change.

S130: The network device determines an area code set to which the area code belongs, where user locations indicated by area codes in the area code set are within a same geographical area range.

In this embodiment, when the UE re-sends the user activation request due to the change of the geographical area, because the request includes the ULI obtained after the location of the UE changes, that is, the area code of the UE changes, the P-GW needs to re-determine an area code set to which the area code of the UE belongs.

S140: The network device acquires, according to a mapping relationship between the area code set and an actual APN, the actual APN for the UE.

In this embodiment, the area code set and the mapping relationship between the area code set and the actual APN are configured in the P-GW. When selecting the actually accessed APN, the P-GW may manage and plan, according to the mapping relationship, the UE that requests access, for example, may provide a planned access rule in advance.

The method for allocating an APN provided by this embodiment of the present invention may be executed by the network device provided by the embodiment shown in FIG. 1 in the present invention. Functions of the steps of the method are corresponding to functions of the modules of the network device provided by the embodiments of the present invention; implementation principles and technical effects thereof are similar, and details are not provided herein again.

Embodiment 5

Figure 7:
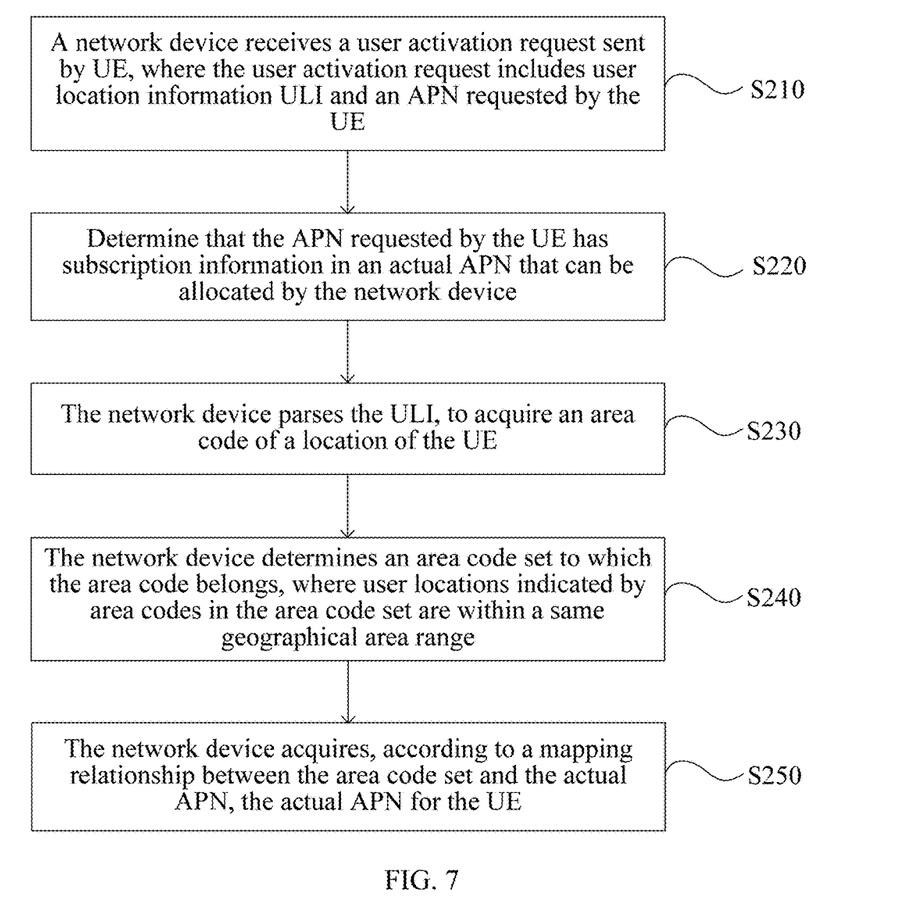
FIG. 7 is a flowchart of a method for allocating an APN according to Embodiment 5 of the present invention.

FIG. 7 is a flowchart of a method for allocating an APN according to Embodiment 5 of the present invention. The method for allocating an APN provided by this embodiment may include the following steps:

S210: A network device receives a user activation request sent by UE, where the user activation request includes user location information ULI and an APN requested by the UE.

S220: Determine that the APN requested by the UE has subscription information in an actual APN that can be allocated by the network device.

In this embodiment, the user activation request received by the network device further includes the APN requested by the UE. Correspondingly, whether the UE has the subscription information may be queried in the actual APN of the UE according to the APN requested by the UE.

S230: The network device parses the ULI, to acquire an area code of a location of the UE.

S240: The network device determines an area code set to which the area code belongs, where user locations indicated by area codes in the area code set are within a same geographical area range.

S250: The network device acquires, according to a mapping relationship between the area code set and the actual APN, the actual APN for the UE.

Specifically, for specific implementation manners of S230 to S250, reference is made to S120 to S140 in Embodiment 4.

In this embodiment, the area code set and the mapping relationship between the area code set and the actual APN are also configured in the network device; and the area code of the location of the UE may also include a LAC, a RAC, or a TAC of the UE.

Further, on the basis of acquiring the actually accessed APN according to the geographical area of the UE in the foregoing embodiment, the method provided by this embodiment may further perform network management and control on the UE according to the APN actually accessed by the UE, that is, network management and control performed based on the user geographical area. It should be noted that, in the following embodiments, the network device that performs management and control is specifically a GGSN in a 2G/3G network or a P-GW in an EPS network. There is a correspondence between the actual APN accessed by the UE and an IP address pool. Correspondingly, the method provided by this embodiment further includes: assigning, by the network device, an IP address to the UE from the IP address pool. In addition, on this basis, the method may further include: collecting, by the network device, statistics on data traffic or signaling in a case of the actual APN, to acquire a data traffic statistical result or signaling statistics for access UE within the geographical area range.

Further, the actual APN accessed by the UE is corresponding to configuration information, where the configuration information may include: a quantity of access UE, used bandwidth, a charging policy, an authentication policy, or a service control policy. Correspondingly, the method provided by this embodiment further includes: controlling, by the network device according to the configuration information, the UE that accesses the actual APN. During specific implementation, in the method provided by this embodiment, the network device may further send user information of the UE to an external server, where the user information may include a correspondence between the UE and the accessed actual APN, and the external server, for example, is a RADIUS server, a service report server, a call history server, or the like, so that the external server analyzes, based on the actual APN, user data reported by using the network device, and then analysis data based on the user geographical area can be obtained.

The method for allocating an APN provided by this embodiment of the present invention may be performed by the network device provided by the embodiment shown in FIG. 2 in the present invention. Functions of the steps of the method are corresponding to functions of the modules of the network device provided by the embodiments of the present invention; implementation principles and technical effects thereof are similar, and details are not provided herein again.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, rather than limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, as long as such modifications and replacements do not cause the essence of corresponding technical solutions to depart from the scope of the technical solutions of the embodiments of the present invention.

What is claimed is:

1. A network device, comprising:
   a receiver configured to receive a user activation request sent by user equipment (UE), wherein the user activation request comprises user location information (ULI) and an access point name (APN) requested by the UE; and
   at least one processor configured to:
      determine that the APN requested by the UE has subscription information in an actual APN;

parse the ULI to acquire a location area code (LAC) of a location of the UE;

determine a LAC group to which the LAC belongs, the LAC group comprising multiple LACs, wherein user locations indicated by the multiple LACs in the LAC group are within a same geographical area range; and acquire, according to a mapping relationship between the LAC group and the actual APN, the actual APN for the UE, wherein the LAC group and the mapping relationship between the LAC group and the actual APN are configured in the network device.

2. The network device according to claim 1, wherein the network device comprises a serving general packet radio service (GPRS) support node (SGSN), a gateway GPRS support node (GGSN), a mobility management entity (MME), or a packet data gateway (P-GW).

3. The network device according to claim 1, wherein:
the network device is a GGSN or a P-GW, and there is a correspondence between the actual APN and an Internet Protocol (IP) address pool; and
the at least one processor is further configured to assign an IP address to the UE from the IP address pool.

4. The network device according to claim 1, wherein:
the network device is a GGSN or a P-GW; and
the at least one processor is further configured to collect statistics on data traffic or signaling in a case of the actual APN, to acquire a data traffic statistical result or a signaling statistical result for access UE within the geographical area range.

5. The network device according to claim 1, wherein:
the network device is a GGSN or a P-GW, the actual APN corresponds to configuration information, and the configuration information comprises: a quantity of access UE, used bandwidth, a charging policy, an authentication policy, or a service control policy; and
the at least one processor is further configured to control, according to the configuration information, UE that accesses the actual APN.

6. The network device according to claim 1, wherein the geographical area range comprises a city.

7. The network device according to claim 1, wherein the actual APN indicates a network operator.

8. A method for allocating an access point name (APN), the method comprising:
receiving, by a network device, a user activation request sent by user equipment (UE), wherein the user activation request comprises user location information (ULI) and an APN requested by the UE;

determining, by the network device, that the APN requested by the UE has subscription information in an actual APN;

parsing, by the network device, the ULI, to acquire a location area code (LAC) of a location of the UE;

determining, by the network device, a LAC group to which the LAC belongs, the LAC group comprising multiple LACs, wherein user locations indicated by the multiple LACs in the LAC group are within a same geographical area range; and acquiring, by the network device according to a mapping relationship between the LAC group and the actual APN, the actual APN for the UE, wherein the LAC group and the mapping relationship between the LAC group and the actual APN are configured in the network device.

9. The method according to claim 8, wherein the network device comprises a serving general packet radio service (GPRS) support node (SGSN), a gateway GPRS support node (GGSN), a mobility management entity (MME), or a packet data gateway (P-GW).

10. The method according to claim 8, wherein:
the network device is a GGSN or a P-GW, and there is a correspondence between the actual APN and an Internet Protocol (IP) address pool; and
the method further comprises:
assigning, by the network device, an IP address to the UE from the IP address pool.

11. The method according to claim 8, wherein:
the network device is a GGSN or a P-GW; and
the method further comprises:
collecting, by the network device, statistics on data traffic or signaling in a case of the actual APN, to acquire a data traffic statistical result or a signaling statistical result for access UE within the geographical area range.

12. The method according to claim 8, wherein:
the network device is a GGSN or a P-GW, the actual APN corresponds to configuration information, and the configuration information comprises: a quantity of access UE, used bandwidth, a charging policy, an authentication policy, or a service control policy; and
the method further comprises:
controlling, by the network device according to the configuration information, UE that accesses the actual APN.

* * * * *